United States Patent
Chiu

(10) Patent No.: US 7,197,590 B2
(45) Date of Patent: Mar. 27, 2007

(54) METHOD AND APPARATUS FOR CONNECTING LPC BUS AND SERIAL FLASH MEMORY

(75) Inventor: Yao-Cheng Chiu, Hsinchu (TW)

(73) Assignee: Winbond Electronics Corp., Hsinchu (TW)

(*) Notice: Subject to any disclaimer, the term of this patent is extended or adjusted under 35 U.S.C. 154(b) by 210 days.

(21) Appl. No.: 10/711,671

(22) Filed: Sep. 30, 2004

(65) Prior Publication Data
US 2005/0283565 A1    Dec. 22, 2005

(30) Foreign Application Priority Data
Jun. 18, 2004 (TW) .............................. 93117608 A

(51) Int. Cl.
*G06F 13/14* (2006.01)

(52) U.S. Cl. .................... 710/305; 710/306; 710/100; 710/103

(58) Field of Classification Search ........ 710/305–306, 710/100; 711/103
See application file for complete search history.

(56) References Cited

U.S. PATENT DOCUMENTS 6,308,192 B1 * 10/2001 Messerly ................ 708/322
2004/0059859 A1 * 3/2004 Chheda ................... 710/307

* cited by examiner

*Primary Examiner*—Mark H. Rinehart
*Assistant Examiner*—Kim T. Huynh
(74) *Attorney, Agent, or Firm*—Jianq Chyun IP Office

(57) ABSTRACT

A method and apparatus for connecting low pin count (LPC, hereinafter) bus and serial flash memory is provided for converting the interface between a LPC bus and a serial flash memory in personal computer systems. The method according to the present invention comprises following procedures. First, a LPC bus instruction is fetched and converted to a serial instruction according to the required format of serial flash memory. The serial instruction is outputted to a serial flash memory. Next, an output data is read from the serial flash memory and converted to the required format according to the LPC bus. Lastly, the output data is outputted to the LPC bus.

10 Claims, 13 Drawing Sheets

METHOD AND APPARATUS FOR CONNECTING LPC BUS AND SERIAL FLASH MEMORY

CROSS-REFERENCE TO RELATED APPLICATION

This application claims the priority benefit of Taiwan application serial no. 93117608, filed Jun. 18, 2004.

BACKGROUND OF THE INVENTION

1. Field of Invention

The present invention relates to an interface connecting method and apparatus for a personal computer system. More particularly, the present invention relates to an interface connecting method and apparatus for a low pin count bus in a personal computer system.

2. Description of Related Art

A basic input/output system (BIOS, hereinafter) is a quite traditional yet very important part in technologies of a personal computer (PC, hereinafter) system. BIOS is the first program that a PC system executes at start up, and many lowest level system functions are provided by the BIOS as well. Hence, a PC system cannot even start up without the BIOS.

A block diagram of BIOS device in a traditional PC system is shown in FIG. 1. A central processing unit (CPU, hereinafter) 101 is connected to a north bridge integrated circuit (IC, hereinafter) 104 via a host bus 102. Next, the north bridge IC 104 is connected to a group of devices including the host bus 102, an accelerated graphic port (AGP, hereinafter) 103, a memory 105 and a peripheral control interface (PCI, hereinafter) bus 106. The PCI bus 106 is connected to PCI expansion slots 107 and a south bridge IC 108. The south bridge IC 108 is connected to a group of devices including the PCI bus 106, an industrial drive electronics (IDE, hereinafter) interface hard disk drive 109 and an industrial standard architecture (ISA, hereinafter) bus 110. Lastly, the ISA bus 110 is connected to a group of devices including the south bridge IC 108, a BIOS device 111, and a super input/output (I/O, hereinafter) card 112. Wherein the super I/O card 112 is for connecting peripherals who support traditional interface only and whose interface transmitting speed is slower, such as a modem, a printer, a keyboard, a mouse, and a joystick.

A standard ISA bus requires 49 pins with 8 MHz clock frequency according to the architecture described above. However, the strong competition in PC industry nowadays drives for a lower cost continuously. Hence, the ISA bus is gradually replaced by a low pin count (LPC, hereinafter) bus that adopts fewer pins and is lower cost. A LPC bus needs only 9 pins, yet its clock frequency is increased to 33 MHz to maintain the transmission bandwidth via the fewer pins.

However, using the LPC bus brings a problem of connecting the BIOS device with traditional ISA interface to a PC system with a LPC bus. A solution is to connect via a super I/O card as shown in FIG. 2. Wherein, the original ISA bus 110 is replaced by a LPC bus 201, and a BIOS device 111 with ISA interface is connected to the LPC bus 201 via an ISA bus 203 and a super I/O card 202 which supports the LPC bus.

In most cases, a flash memory is used for storing the BIOS program, while a traditional flash memory is using a parallel interface. Accordingly, the block diagram of a super I/O card is shown in FIG. 3. The super I/O card 202 comprises a LPC bus decoder 301, a register mode controller 302, and a bus converter 303. Wherein, the LPC bus decoder 301 reads an instruction from the LPC bus 201, converts the instruction to a format which is easier for processing, transmits the converted instruction to the register mode controller 302 and the bus converter 303, and further transmits the output data from a parallel flash memory 304 to the LPC bus 201. The register mode controller 302 controls assorted functions of the parallel flash memory 304 and the bus converter 303 outputs the decoded instructions to the ISA bus 203 allowing the parallel flash memory 304 to receive them. Meanwhile, the bus converter receives the data outputted from the parallel flash memory 304 as well and transmits the output data back to the LPC bus decoder 301.

The detailed functions of the bus converter 303 are shown in FIG. 4. According to time sequence starting from left side, the signals of instruction on the LPC bus 201 comprises a start signal 401, a command field 402, an address field 403, a data field 404 (only presents in a write instruction), a wait time 405 for waiting the parallel flash memory 304 to execute the instruction and feedback a result, an output data 406 (only presents upon execution of a read instruction), and a terminate signal 407.

According to operations of the bus converter 303, the command field 402, the address field 403, and the data field 404 of a LPC bus instruction are first fetched and stored in a latch 408. Next, those latched signals are converted to an acceptable format of the parallel flash memory 304 by a command decoder 409, an address compare multiplexer 410, and a data compare multiplexer 411 respectively. Those converted signals are outputted to the parallel flash memory 304 via a memory signal converter 412. When a read instruction is executed, the data outputted from the parallel flash memory 304 is transmitted back to the LPC bus 201 to be the output data 406.

The signals appeared on the LPC bus 201 and their correlative timings when a read or write command is executed by the parallel flash memory 304 are shown in FIG. 5. The upper part of the LPC bus 201 illustrates signals of instruction when executing a read command, starting with a start signal 401, a command field 402, an address field 403, a terminate signal 407, a wait time 405, a synchronous signal 501, a output data 406, and another terminate signal 407. The lower part of the LPC bus 201 illustrates signals of instruction when executing a write command, starting with a start signal 401, a command field 402, an address field 403, a data field 404, a terminate signal 407, a wait time 405, a synchronous signal 501, and another terminate signal 407.

According to FIG. 5, a wait time 405 is always present for waiting the parallel flash memory 304 finishing execution after an instruction is transmitted, regardless of read instruction or write instruction. According to the comparison of the wait time 405 with the LPC bus clock signal 502 and with the ISA bus clock signal 503, the duration of the wait time 405 is equivalent to 4.5 ISA bus clock cycles or 18 LPC bus clock cycles approximately.

For further cost down, a serial flash memory with fewer pins is preferred for storing BIOS. While neither a prior art nor an existing apparatus, e.g. a super I/O card, is available currently for connecting a serial flash memory to the LPC bus. Therefore, a new technology is needed for connecting LPC bus and serial flash memory, in order to further reduce the cost of a PC system.

SUMMARY OF THE INVENTION

The present invention is direct to a method and apparatus for connecting LPC bus and serial flash memory, allowing a serial flash memory with fewer pins to replace a traditional parallel flash memory for connecting to a LPC bus. Hence, benefits including lower cost, simpler design, and lower possibility of malfunction are provided.

The present invention further provides a fast fetch and output function along with the aforementioned method for overcoming the disadvantage of slower data transmitting speed in serial mode comparing to that in parallel mode. Thus, the transmission speeds of a serial flash memory and a parallel flash memory can be parallel.

According to an embodiment of the present invention, a method for connecting LPC bus and serial flash memory comprises following procedures. First, a LPC bus instruction is fetched. Next, the LPC bus instruction is converted to a serial instruction according to the required format of a serial flash memory, where the conversion is applicable to common operations for a memory including 1 byte reading or 1 byte writing.

Furthermore, a fast fetch and output function is provided. Since a serial flash memory uses clocks to identify the address and data signals on the same signal line, additional time is spent in exchange for using fewer pins. For example, a group of 24 address lines can be totally replaced by 1 signal line in a serial flash memory, while additional time of 24 clocks are induced correspondingly. For better transmission efficiency, N bytes of data are grouped into a unit for a preferred combination of buffer process since 8 *N bits are the efficient size for the CPU process of computer. Furthermore, the contiguous read or write functions of serial flash memories are adopted, where the address of next data is equivalent to the address of current data plus one. When N bytes of data are grouped for reading and writing to a serial flash memory simultaneously, only the time of one byte of data is used for address output and mapping. Thus, t he transmission efficiency is increased effectively. Detailed descriptions and illustrations are provided in following paragraphs.

According to another aspect, the present invention further provides an apparatus for connecting LPC bus and serial flash memory comprising a latch, an instruction converter, a parallel to serial converter, a serial output device, and a serial to parallel converter. Wherein, the latch registers and outputs a LPC bus instruction from the LPC bus. The instruction converter receives the LPC bus instruction outputted from the latch, converts to a serial instruction according to the required format of the serial flash memory and outputs the serial instruction. The parallel to serial converter receives and records the serial instruction outputted from the instruction converter. When the serial instruction is a read instruction, M serial data are read to registers at one time after the serial instruction of parallel signals is converted to the serial signals output, and those data in register are outputted sequentially to the LPC bus; when the serial instruction is a write instruction, N write instructions are recorded cumulatively, then those write instructions are combined and converted from parallel signals to serial signals output, where M and N are positive integers that may be a identical value or different values. The serial output device is coupled to between the parallel to serial converter and a serial flash memory, for outputting the serial signals from the parallel to serial converter to the serial flash memory. The serial to parallel converter receives an output data which is needed for responding to the LPC bus instruction from the serial flash memory, converts the output data to the required format of the LPC bus and outputs the output data to the LPC bus.

The present invention provides a method and apparatus for connecting LPC bus and serial flash memory, such that replaces the traditional parallel flash memory. Since fewer pins are adopted for a serial flash memory comparing to a parallel flash memory, the number of pins and bus lines in a PC system can be reduced accordingly. Therefore, the present invention provides benefits including lower cost, simpler design, and lower possibility of malfunction.

In order to the make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The present invention provides an apparatus and method that allows a serial flash memory to replace a traditional parallel flash memory in a personal computer (PC, hereinafter) system with a low pin count (LPC, hereinafter) bus. A parallel flash memory adopts 32 pins, while a serial flash memory adopts only 8 pins. The considerable pin count reduction serves to simplify the design of a PC system, reduce cost, and to diminish the possibility of malfunction.

Figure 6:
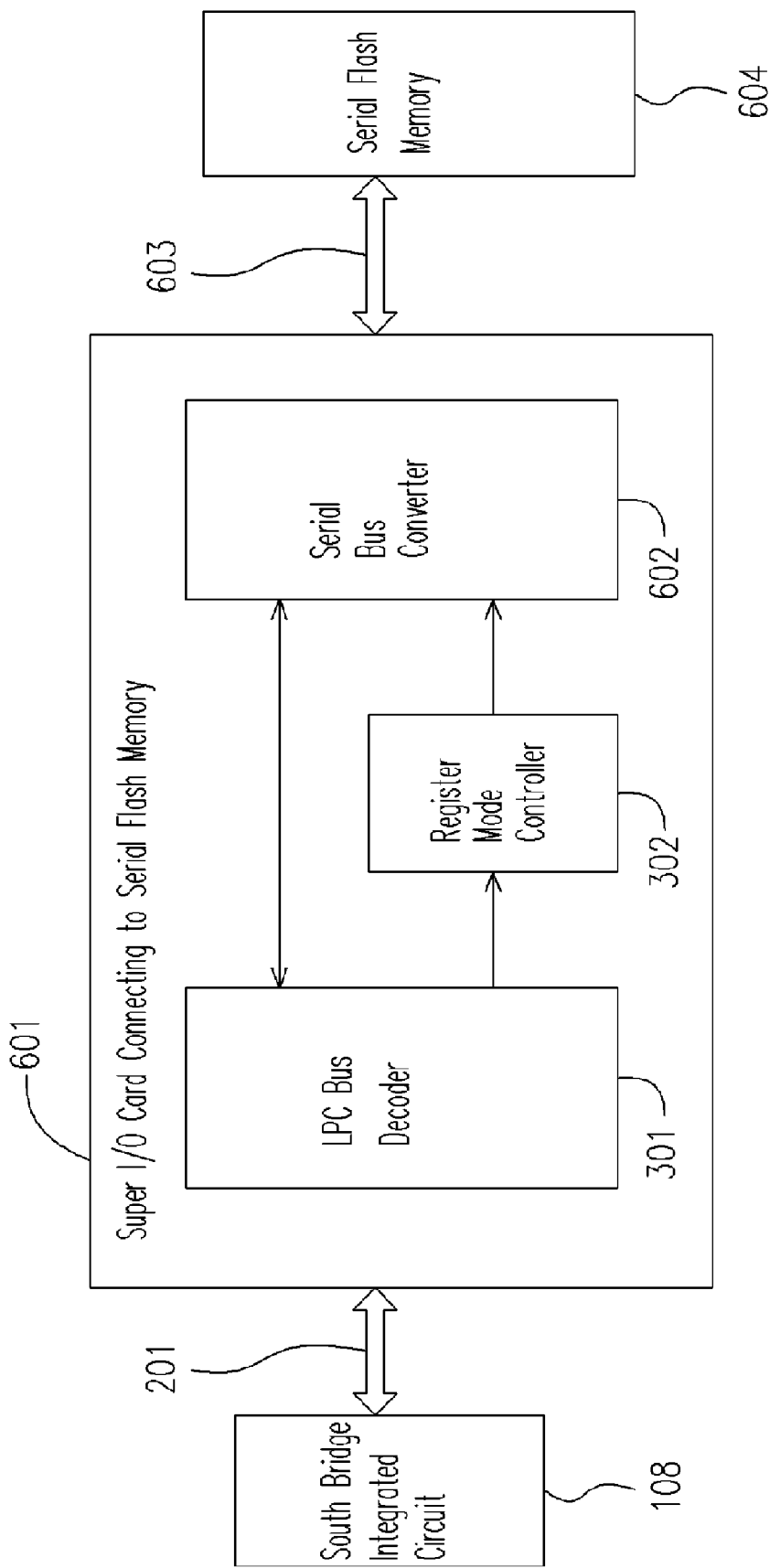
FIG. 6 is a block diagram of a super I/O card connecting to a serial flash memory, according to an embodiment of apparatus for connecting LPC bus and serial flash memory provided by the present invention.

An embodiment of apparatus for connecting LPC bus and serial flash memory according to the present invention is described herein. A connecting device in the embodiment of the present invention is a super I/O card whose elements are shown in FIG. 6. Referring to FIG. 6, the super I/O card 601 comprises a LPC bus decoder 301, a register mode controller 302, and a serial bus converter 602. Wherein, the LPC bus decoder 301 fetches instructions from the LPC bus 201, converts the fetched instructions to a format which is easier for processing, transmits the converted instructions to the register mode controller 302 and the serial bus converter 602, and further transmits the output data from a serial flash memory 604 to the LPC bus 201. The register mode controller 302 controls assorted functions of the serial flash memory 604 and the serial bus converter 602 outputs the decoded instructions to a serial bus 603 thereby to be received by the serial flash memory 604. In addition, the serial bus converter 602 receives the data outputted from the serial flash memory 604 as well, and transmitted back to the LPC bus decoder 301.

Figure 1:
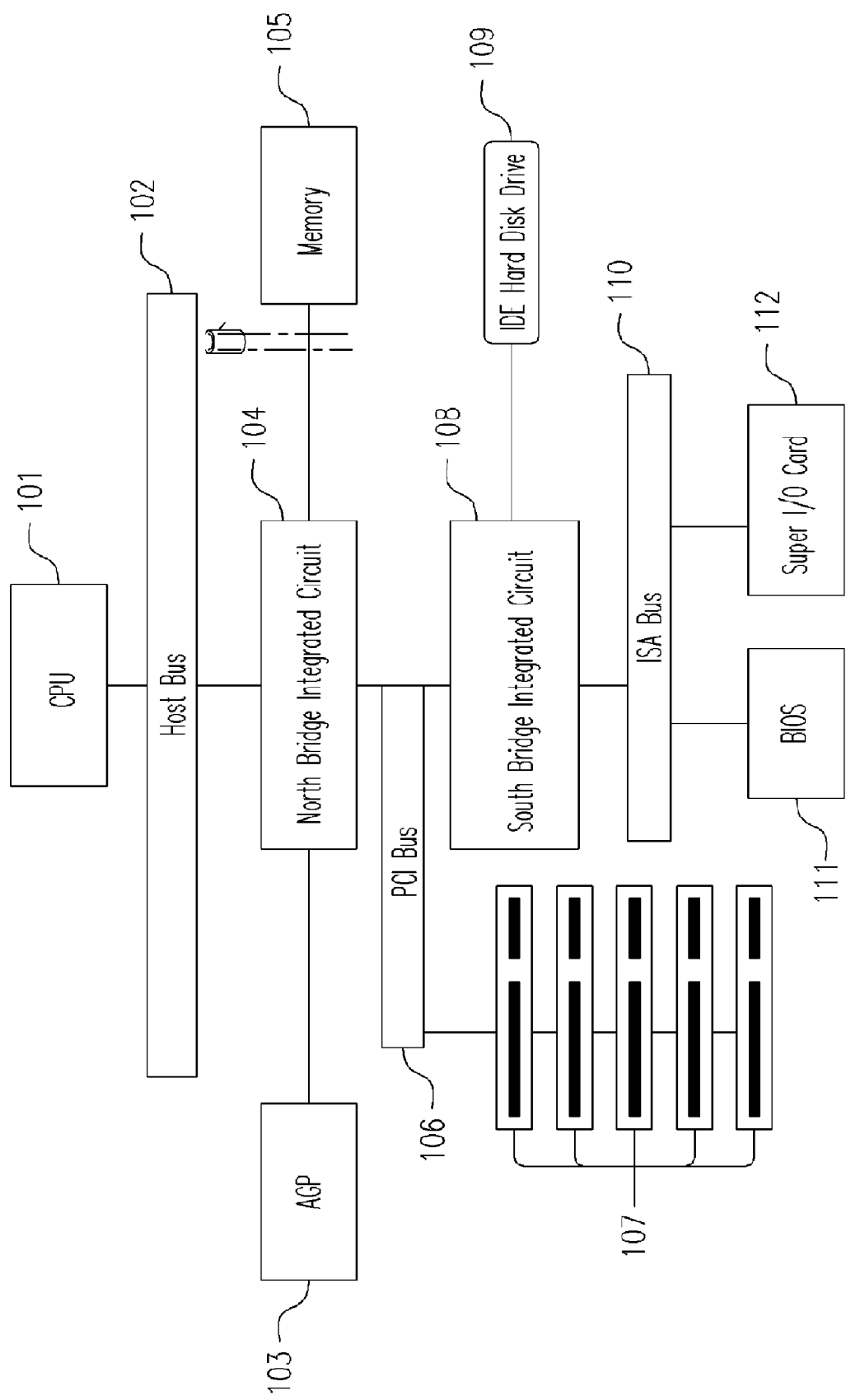
FIG. 1 is a block diagram of a traditional PC system using ISA bus.
Figure 2:
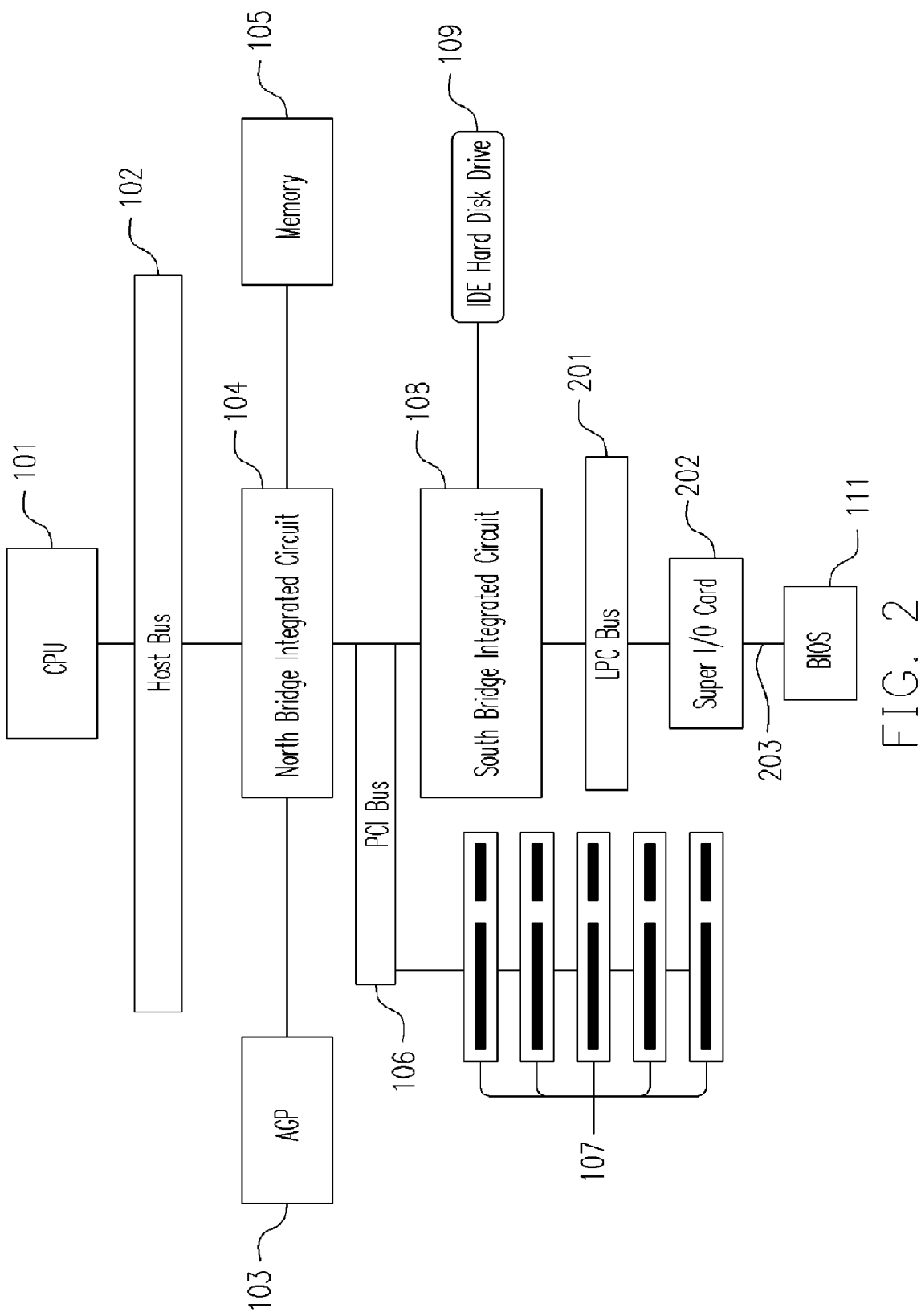
FIG. 2 is a block diagram of a traditional PC system using LPC bus.
Figure 3:
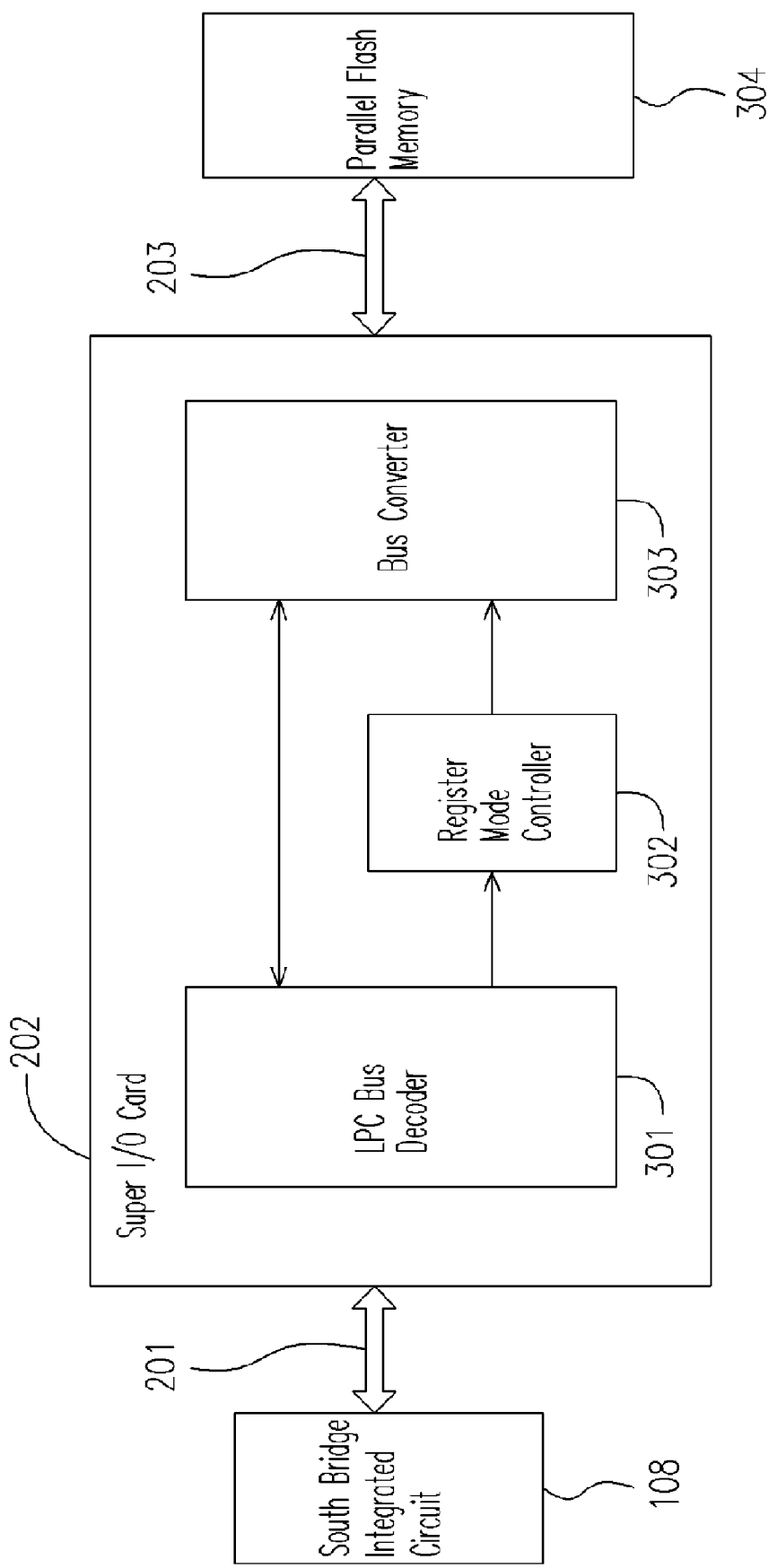
FIG. 3 is a block diagram of a super I/O card connecting to a parallel flash memory.
Figure 4:
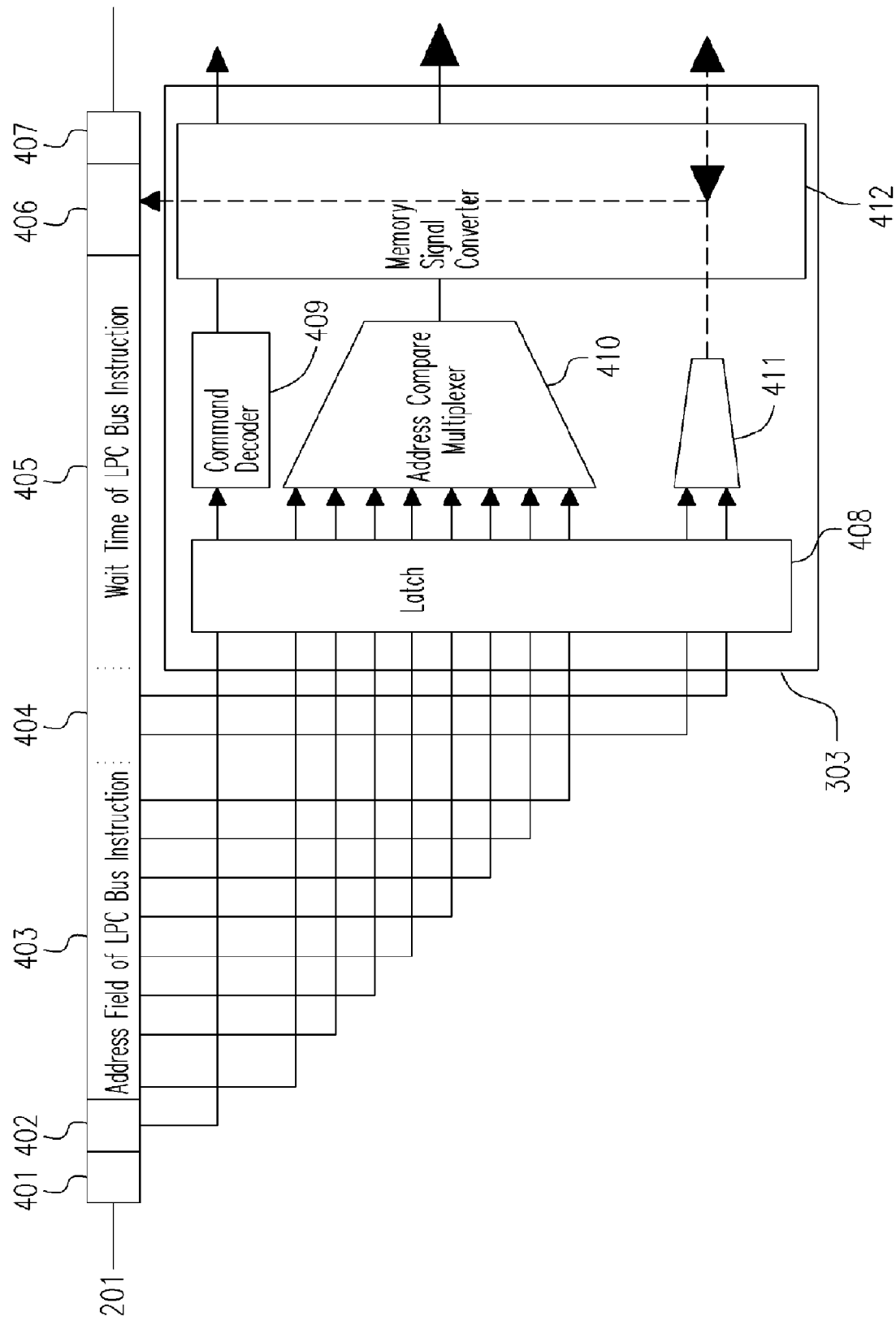
FIG. 4 is a detailed block diagram of an interface connecting a LPC bus and a parallel flash memory.
Figure 7:
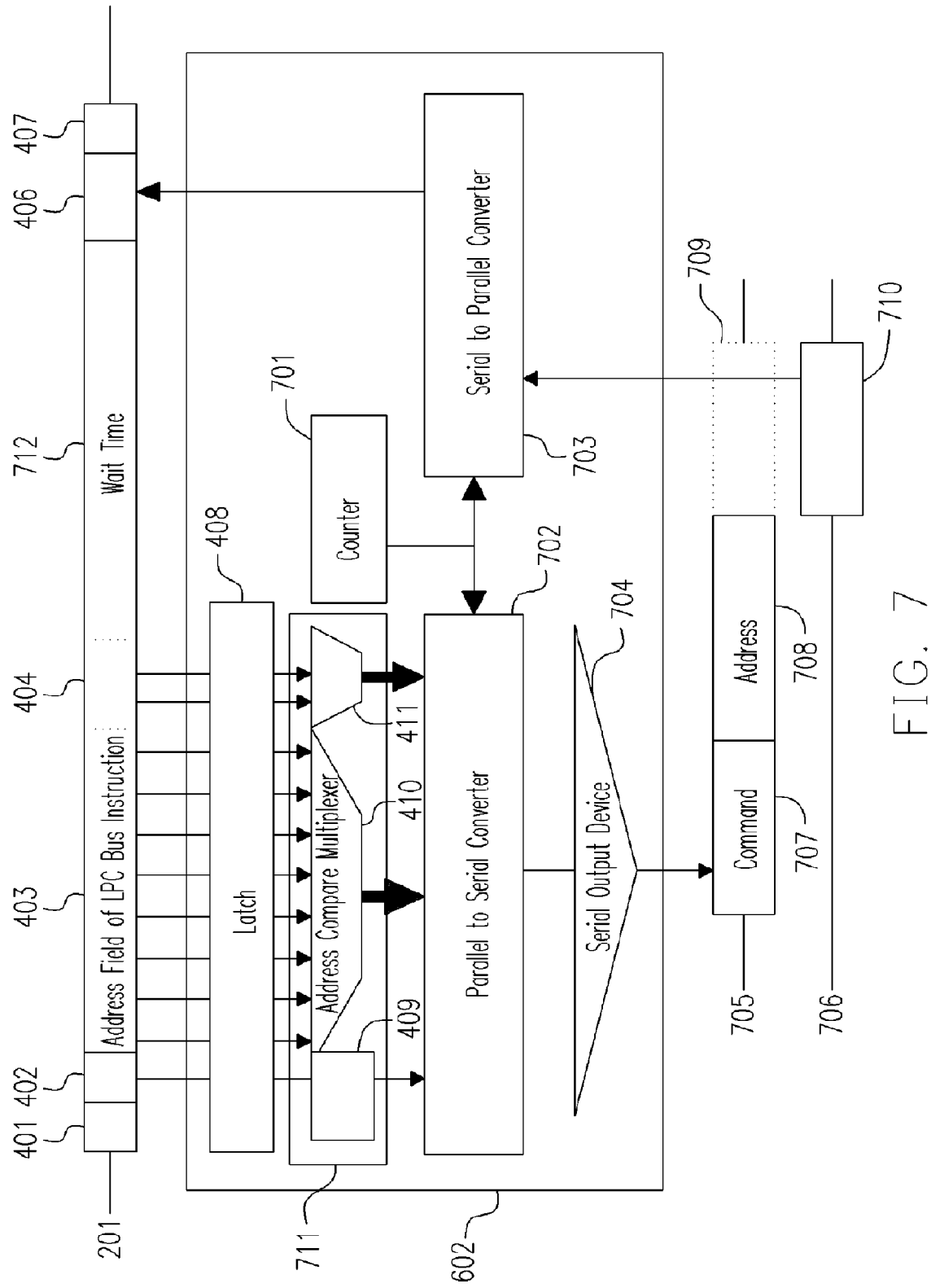
FIG. 7 is a detailed block diagram of an interface connecting a LPC bus and a serial flash memory, according to an embodiment of apparatus for connecting LPC bus and serial flash memory provided by the present invention.

The detailed functions of the serial bus converter 602 are shown in FIG. 7. Wherein, signals of instruction on the LPC bus 201 are the same as those signals shown in FIG. 4, except for a different duration between the wait time 712 and the wait time 405. Therefore, redundant descriptions are spared. While the differences between the wait time 712 and the wait time 405 will be described in later paragraphs.

According to the serial bus converter 602, first, a command field 402, an address field 403 and a data field 404 of a LPC bus instruction are fetched and stored in a latch 408. Next, those latched signals are converted to a serial instruction according to the required format of the serial flash memory 604 by an instruction converter 711, where the instruction converter 711 comprises a command decoder 409, an address compare multiplexer 410, and a data compare multiplexer 411. Then, the serial instruction is converted from parallel signals to serial signals by a parallel to serial converter 702, outputted to a serial data in line 705 via a serial output device 704, and received by the serial flash memory 604.

Provided the current serial instruction is a write instruction, a sequence of signals from the serial instruction is present on the serial data in line 705, where the sequence of signals comprises a command field 707, an address field 708, and a data field 709. Provided the current serial instruction is a read instruction, the data field 709 is not present, while an output data 710 is transmitted to a serial data out line 706 after the read command is received by the serial flash memory 604. Next, the output data 710 is received by a serial to parallel converter 703, converted from serial signals to a format according to the LPC bus 201, and outputted as the output data 406 of the LPC bus instruction.

Lastly, a counter 701 receives clock signals from the LPC bus 201, calculates and outputs cycle counts of the clock signals to the parallel to serial converter 702 and the serial to parallel converter 703. Thus, the command field 707, the address field 708, and the data field 709 of a serial instruction are identified.

Figure 8:
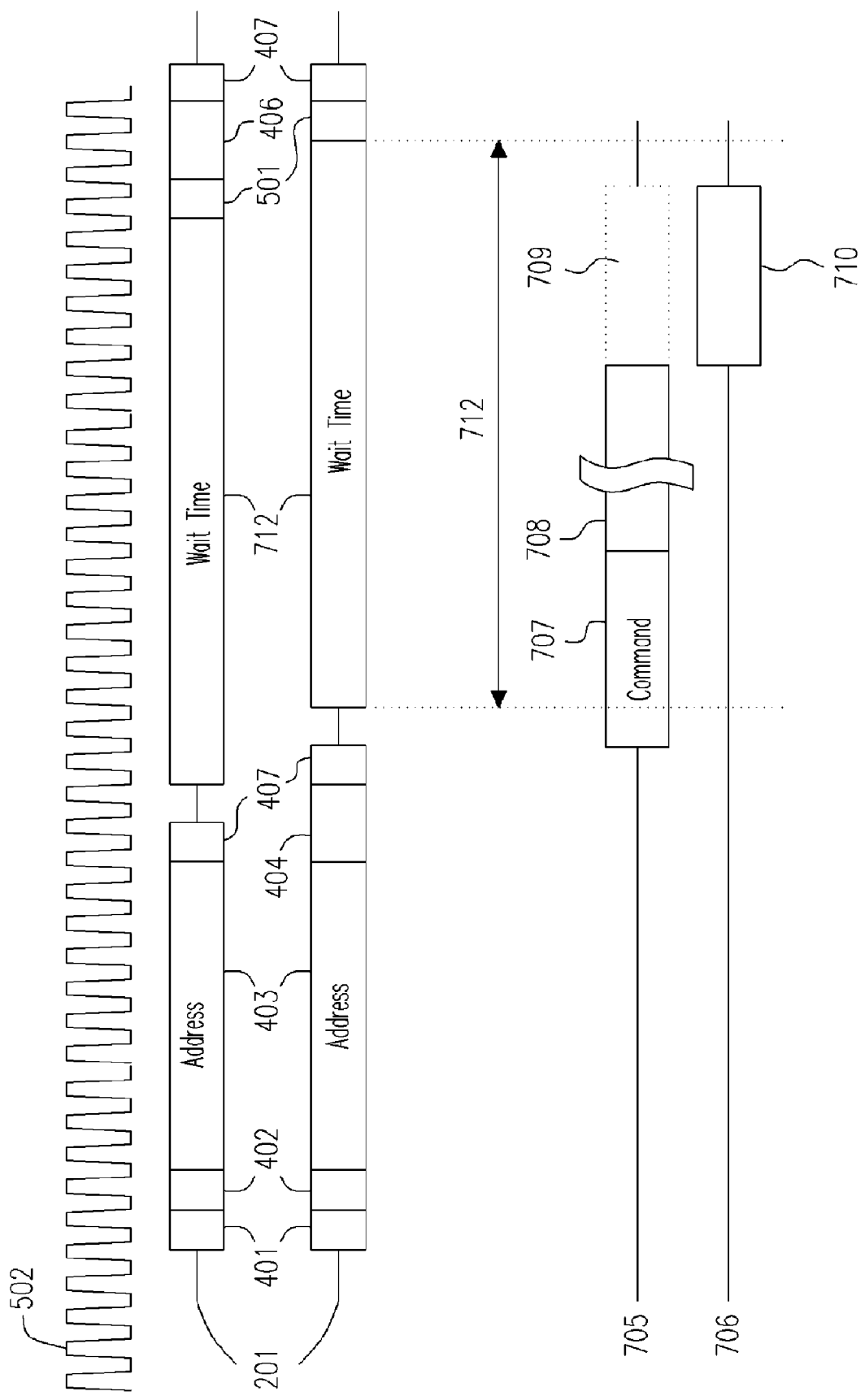
FIG. 8 is a signal and timing correlation diagram of a LPC bus instruction when a serial flash memory executes a read write instruction, according to an embodiment of apparatus for connecting LPC bus and serial flash memory provided by the present invention.

When a serial flash memory 604 is executing read and write commands, a signal and timing correlation diagram of the signals of instruction on the LPC bus 201, on the serial data in line 705, and on the serial data out line 706 is shown in FIG. 8. The upper part of the LPC bus 201 illustrates signals of instruction while executing a read command, and the lower part of the LPC bus 201 illustrates signals of instruction while executing a write command. Wherein, the signals of instruction on the LPC bus 201 are the same as those signals shown in FIG. 5, except for a different duration between the wait time 712 and the wait time 405. Therefore, redundant descriptions are spared.

Figure 5:
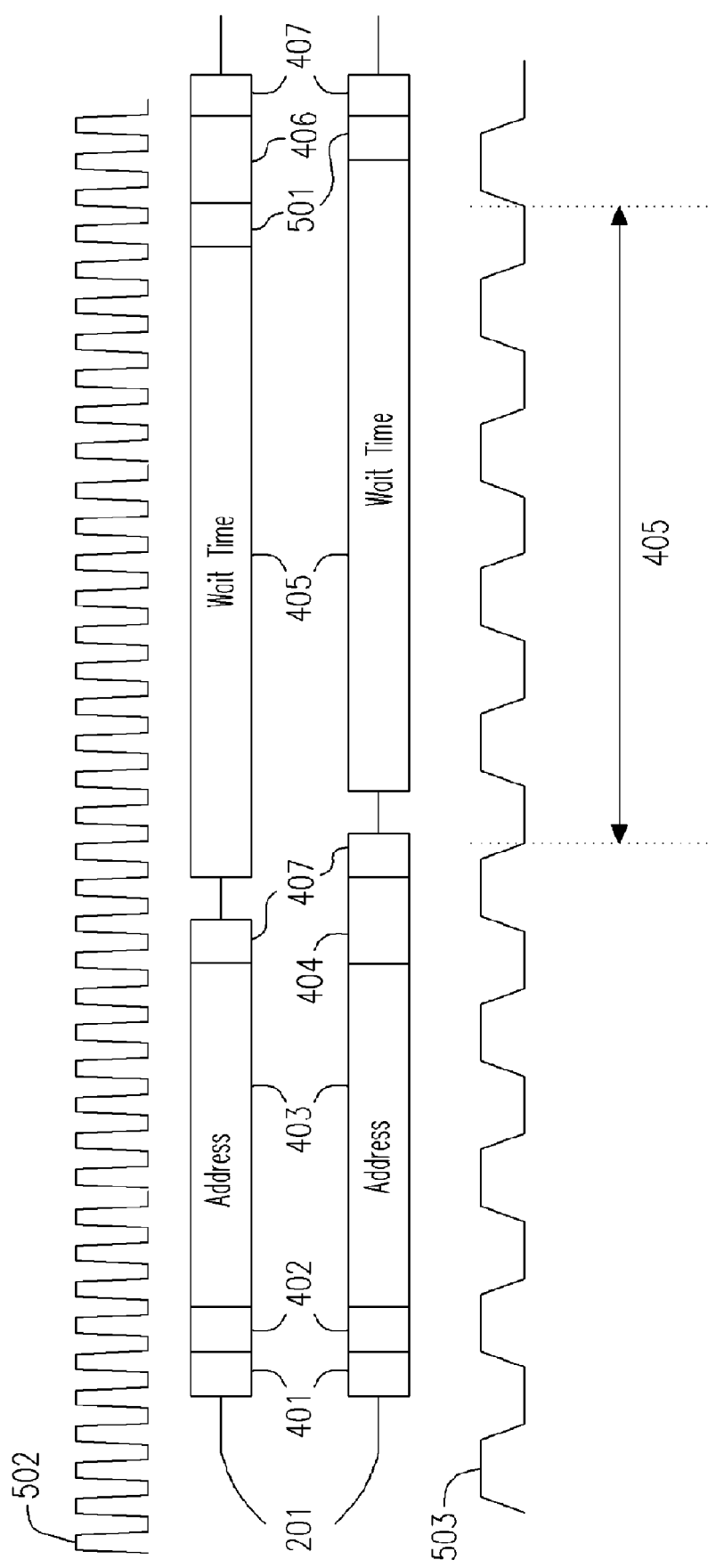
FIG. 5 is a signal and timing correlation diagram of a LPC bus instruction when a parallel flash memory executes a read or a write instruction.

A notice is needed that the duration of wait time 405 shown in FIG. 5 is equivalent to 18 LPC bus clock cycles, while the duration of wait time 712 shown in FIG. 8 is comparatively longer that equivalent to 46 LPC bus clock cycles. Since a serial flash memory sacrifices transmission bandwidth in exchange for reducing pin count, the speed of normal reading and writing is comparatively slower comparing to the speed of a parallel flash memory. An apparatus according to the present invention provides a solution of modifying the normal read and normal write functions to fast read and fast write functions, described as follows.

Figure 9:
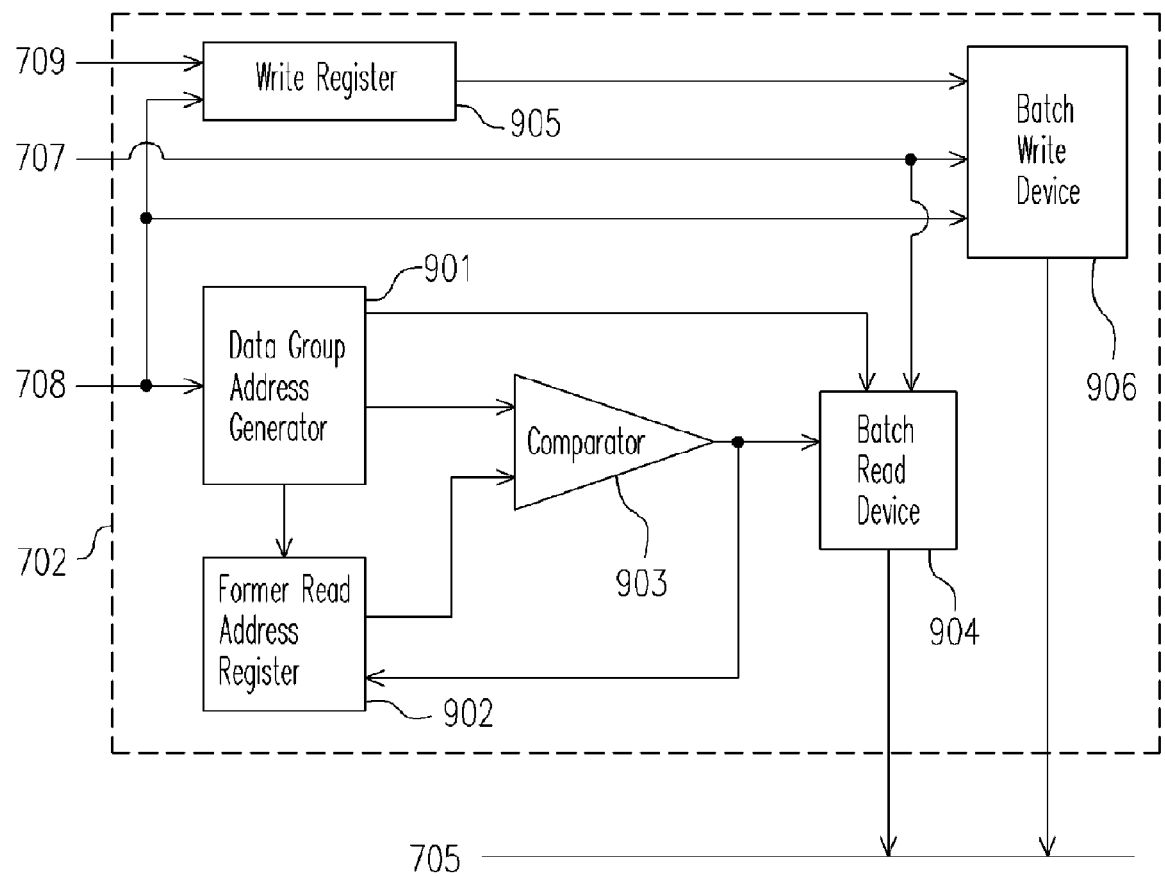
FIG. 9 is a detailed block diagram of a parallel to serial converter, according to an embodiment of apparatus for connecting LPC bus and serial flash memory provided by the present invention.
Figure 10:
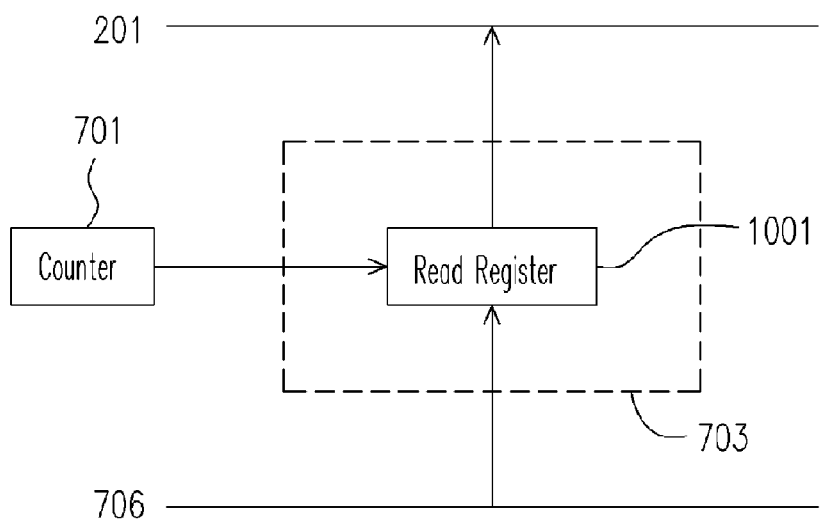
FIG. 10 is a detailed block diagram of a serial to parallel converter, according to an embodiment of apparatus for connecting LPC bus and serial flash memory provided by the present invention.

The fast read and fast write functions are implemented by the parallel to serial converter 702 and the serial to parallel converter 703, where detailed block diagram of the parallel to serial converter 702 is shown in FIG. 9 and details block diagram of the serial to parallel converter 703 is shown in FIG. 10.

According to the fast read function, N bytes of data are read at one time and stored for sequential output such that the total wait time is reduced. Wherein, N bytes of data are grouped into a unit for a preferred combination of buffer process, because 8*N bits is the efficient size for CPU process. For example, an embodiment of the present invention according to 32 bits CPU groups 4 bytes of data for buffer process. Referring to FIG. 9 and FIG. 10, when a read data serial instruction is received by the parallel to serial converter 702 the address field 708 of the serial instruction is passed through a data group address generator 901. Since 4 bytes of data are grouped into a unit, the two least significant bits (LSB, hereinafter) of an address can identify 4 different bytes of data. While according to a unit for buffer process, a data group address is generated and outputted by ignoring the two LSB. Next, the data group address and a former read address stored in a former read address register 902 are inputted to a comparator 903 for comparing that whether these two addresses are equal or not. If not equal, a batch read device 904 generates an instruction to the serial flash memory according to the command field 707 and the address field 708 of the serial instruction. The instruction reads 4 bytes of data at one time with the address starting from current address field 708, which is the current read address. These 4 bytes of data are received and stored by a read register 1001. Meanwhile, the former read address stored in the former read address register 902 is replaced by the data group address at present.

Afterwards, the read register 1001 constantly outputs a byte of data corresponding to the address field 708, regardless the result of comparison from the comparator 903. Actually, the read register 1001 decides which byte of data to be outputted according to the cycle clock counts from the counter 701. When the data group address of succeeding read instructions is equivalent to the address stored in the former read address register 902, the data is identified to be in the same unit and is already stored in the read register 1001. Hence, the batch read device 904 is inactive. While the read register 1001 still outputs a byte of data corresponding to the address field. Accordingly, an embodiment of reading several data at one time for outputting sequentially is provided.

Figure 11:
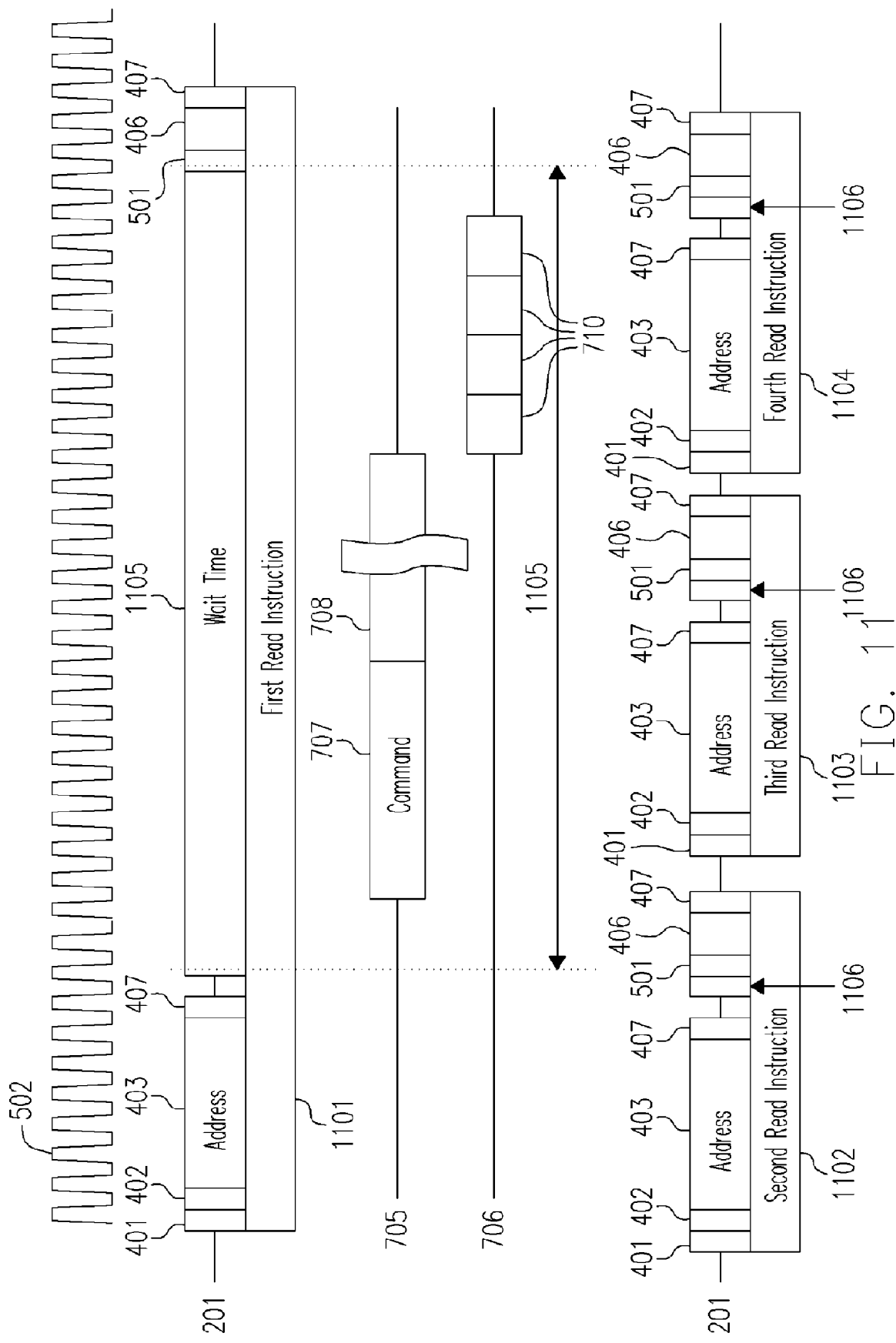
FIG. 11 is a signal and timing correlation diagram of a fast read instruction, according to an embodiment of apparatus for connecting LPC bus and serial flash memory provided by the present invention.

The dynamics of wait time according to the fast read function is shown in FIG. 11. Provided a first read instruction 1101, a second read instruction 1102, a third read instruction 1103, and a fourth read instruction 1104 are present on the LPC bus 201 sequentially for reading 4 bytes of data with contiguous address. Hence, the data group addresses of these 4 read instructions are identical. The first read instruction 1101 needs to wait for the serial flash memory outputting 4 bytes of data, so that results in a very long wait time 1105 whose duration is equivalent to 69 LPC bus clock cycles. While the succeeding 3 read instructions can obtain data from the read register 1001, so that the wait time 1106 is very short with the duration of only 1 LPC bus clock cycle. Thus, average wait time for the 4 read instruction is equivalent to:

(69+3)/4=18 LPC bus clock cycles.

Accordingly, the average wait time of fast read function is equivalent to the reading wait time of a parallel flash memory. Therefore, a serial flash memory can reach an equivalent performance of a parallel flash memory in reading data.

The concept of fast read function is adapted to the fast write function, that is to store the writing data sequentially, and write to a serial flash memory in batch so that the wait time can be shorten. Referring to FIG. 9, when a serial instruction of writing data is present, the data field 709 of the serial instruction is stored by a write register 905. Until both the 2 LSB of the address field 708 of serial instruction become 1, that is 4 bytes of data have been collected, the 4 bytes of data as well as the command field 707 and address field 708 of the serial instruction are received by a batch write device 906. Then, an instruction is issued to the serial flash memory for writing the 4 bytes of data at one time.

Figure 12:
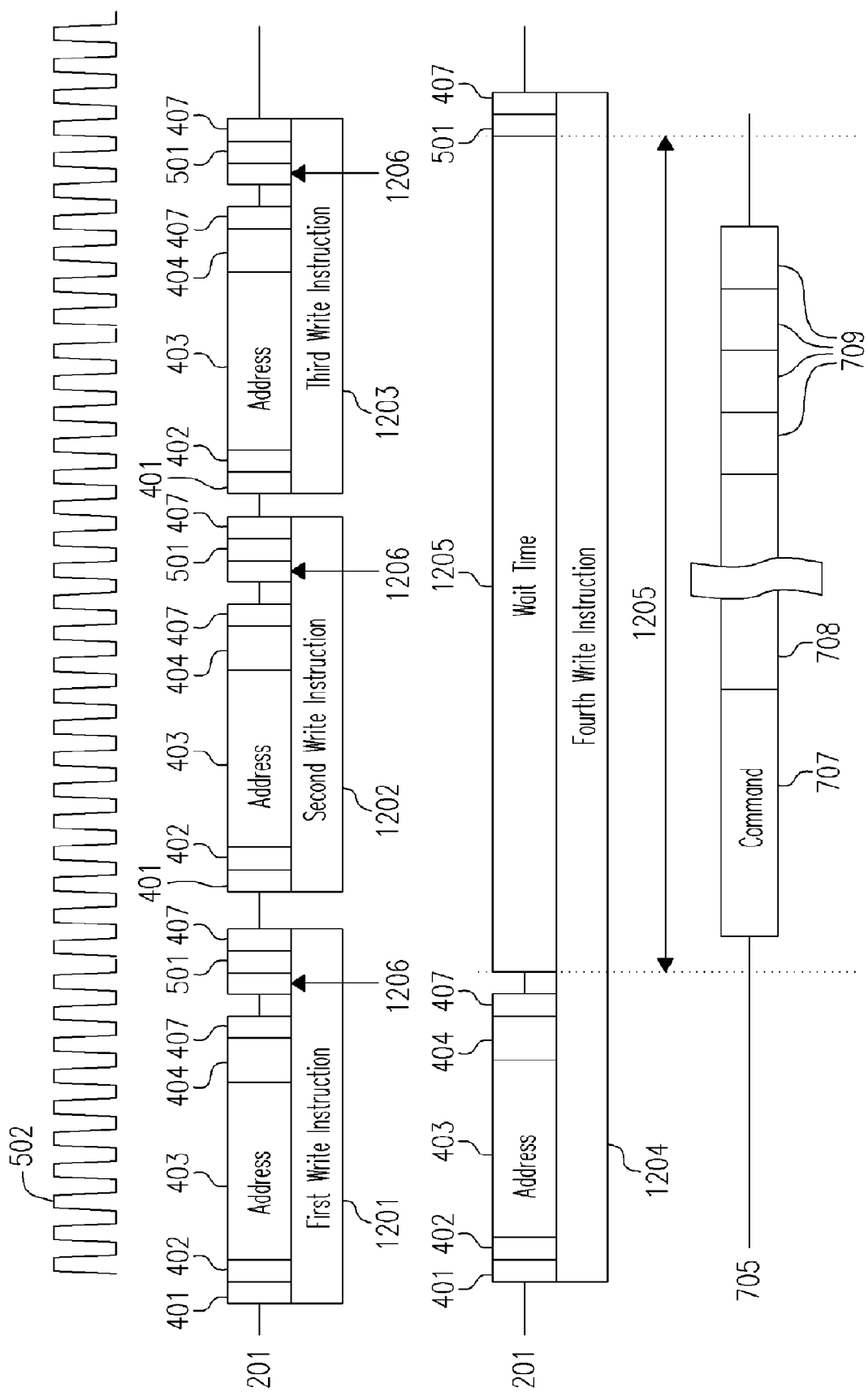
FIG. 12 is a signal and timing correlation diagram of a fast write instruction, according to an embodiment of apparatus for connecting LPC bus and serial flash memory provided by the present invention.

The dynamics of wait time according to the fast write function is shown in FIG. 12. Provided a first write instruction 1201, a second write instruction 1202, a third write instruction 1203, and a fourth write instruction 1204 are present on the LPC bus 201 sequentially for writing 4 bytes of data with contiguous address. The first three write instructions only need to write the data into the write register 905, so that their wait time 1206 are very short with the duration of only 1 LPC bus clock cycle. While the fourth write instruction 1204 needs to write 4 bytes of data to the serial flash memory, so that results in a very long wait time 1205 whose duration is equivalent to 58 LPC bus clock cycles. Thus, average wait time for the 4 write instructions is equivalent to:

(58+3)/4≈15.3 LPC bus clock cycles.

Accordingly, the average wait time of fast write function is shorter comparing to the writing wait time of a parallel flash memory. Therefore, a serial flash memory performs even faster in writing data.

According to the embodiment of the present invention described above, the fast read function reads 4 bytes of data from the serial flash memory at one time, and the fast write function also writes 4 bytes of data at one time. Actually, the number of bytes for reading may be different from the number of bytes for writing.

Figure 13:
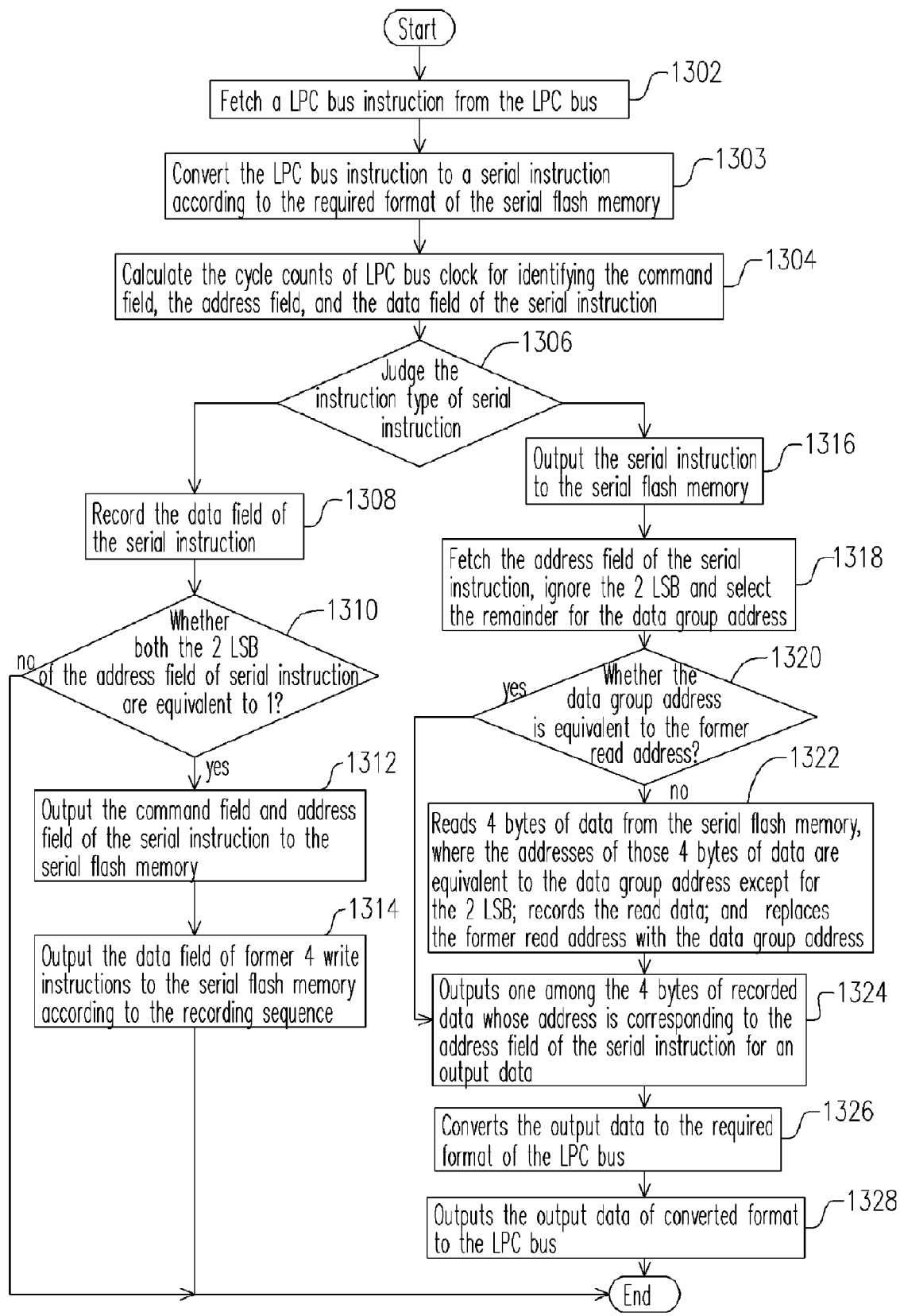
FIG. 13 is a flowchart of fast read and fast write functions, according to an embodiment of method for connecting LPC bus and serial flash memory provided by the present invention.

An embodiment of method for connecting LPC bus and serial flash memory according to the present invention is described as follows. The flow chart of the fast read and fast write functions according to the embodiment is shown in FIG. 13. First, a procedure 1302 fetches a LPC bus instruction from the LPC bus. Next, a procedure 1303 converts the LPC bus instruction to a serial instruction according to the required format of the serial flash memory. A procedure 1304 calculates the cycle counts of LPC bus clock for identifying the command field, the address field, and the data field of the serial instruction.

Following the procedure 1304, a procedure 1306 judges the instruction type of serial instruction. Provided the serial instruction is a write instruction, a procedure 1308 records the data field of the serial instruction; and a procedure 1310 checks that whether both the 2 LSB of the address field of the serial instruction are equivalent to 1. If is not equal, the flow chart of the present embodiment is stopped. If is equal, a procedure 1312 outputs the command field and address field of the serial instruction to the serial flash memory; and a procedure 1314 outputs the data field of former 4 write instructions to the serial flash memory according to the recording sequence.

Provided the present serial instruction is a read instruction according to the judgment of procedure 1306, a procedure 1316 outputs the serial instruction to the serial flash memory. A procedure 1318 fetches the address field of the serial instruction, ignores the 2 LSB and selects the remainder for the data group address. Next, a procedure 1320 checks that whether the data group address is equivalent to the former read address. If is equal, a procedure 1322 is skipped and a procedure 1324 is executed directly. If is not equal, the procedure 1322 reads and records 4 bytes of data from the serial flash memory, where the addresses of those 4 bytes of data are equivalent to the data group address except for the 2 LSB. Meanwhile, the former read address is replaced by the data group address in the procedure 1322. Afterwards, the procedure 1324 outputs one among the 4 bytes of recorded data whose address is corresponding to the address field of the serial instruction for an output data. A procedure 1326 converts the output data to the required format of the LPC bus. Lastly, a procedure 1328 outputs the output data of converted format to the LPC bus.

Figure 14:
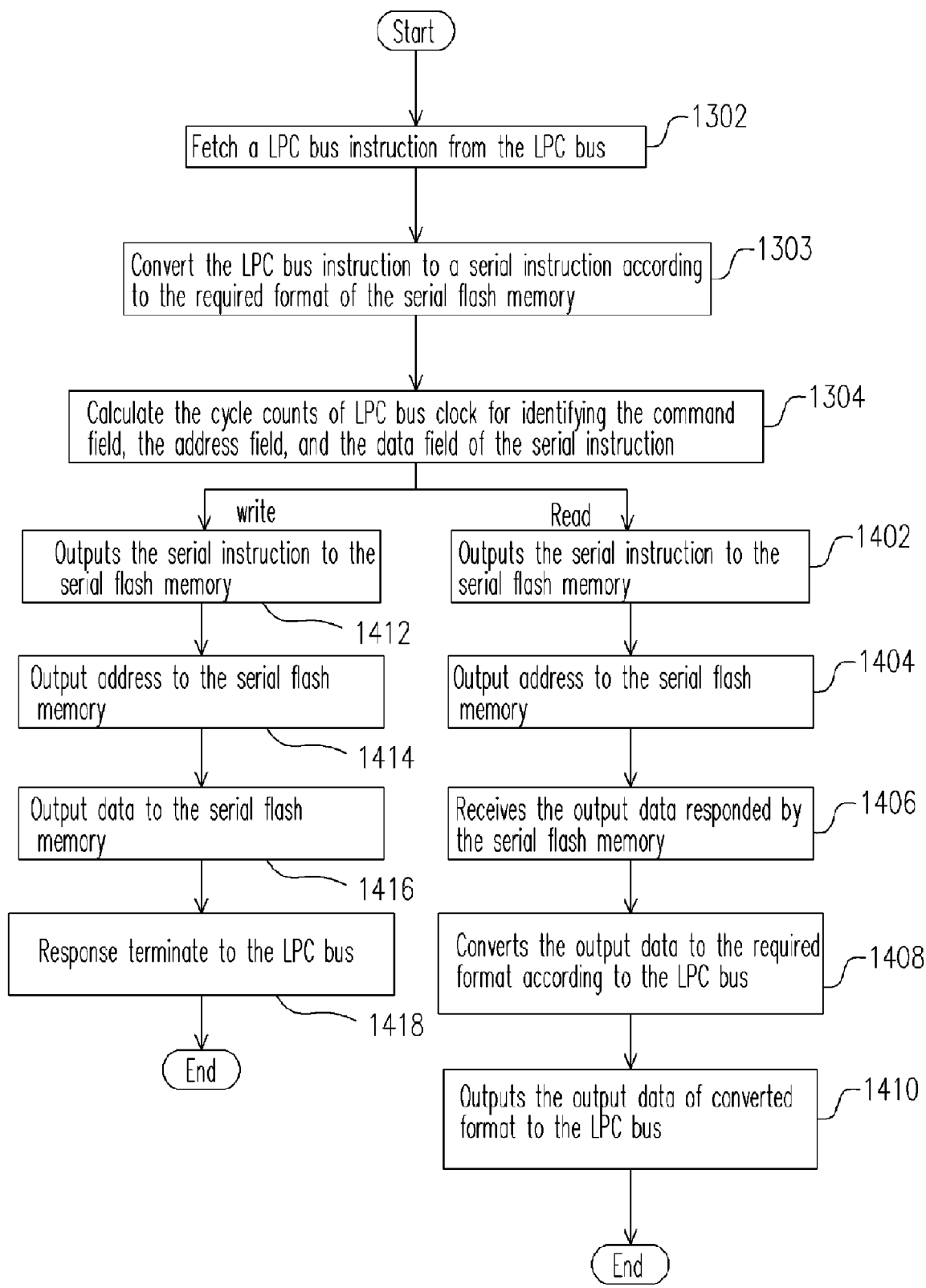
FIG. 14 is a flowchart of normal read and normal write functions, according to an embodiment of method for connecting LPC bus and serial flash memory provided by the present invention.

The above descriptions depict the operation of the fast read and fast write functions. While the flow chart of the normal read and normal write functions is shown in FIG. 14. The flow chart for normal modes is simple and direct in comparison with the fast modes, wherein the first 3 procedures are identical to the fast modes and differences of procedure is starting from a procedure 1402. For the read operation, the procedure 1402 outputs the serial instruction to the serial flash memory upon the identification of the serial instruction by the procedure 1304. In procedure 1404, the address is output to the serial flash memory. Next, a procedure 1406 receives the output data responded by the serial flash memory and a procedure 1408 converts the output data to the required format according to the LPC bus.

Lastly, a procedure 1410 outputs the output data of converted format to the LPC bus. For the write operation, the procedures 1412, 1414, 1416, and 1418 are performed. In procedure 1412, the serial instruction is output to the serial flash memory. In procedure 1414, the address is output to the serial flash memory. In procedure 1416, the data are output to the serial flash memory. In procedure 1418, a termination is responded to the LPC bus. And then, the procedure goes to the end.

According to the aforementioned embodiment of the method for connecting LPC bus and serial flash memory, the read data function reads 4 bytes of data from the serial flash memory at one time and the write data function writes 4 bytes of data at one time as well. Actually, the number of bytes for reading at one time may be different from the number of bytes for writing at one time.

According to the aforementioned descriptions and examples, the present invention provides a method and apparatus for connecting LPC bus and serial flash memory, allowing a serial flash memory to replace a traditional parallel flash memory. Since fewer pins are adopted in a serial flash memory, using a serial flash memory serves to simplify the design of a PC system, reduce cost and lower the possibility of malfunction. Furthermore, by means of fast read and fast write functions, the average read time of a serial flash memory can be similar to that of a traditional parallel flash memory. While the average write time of a serial flash memory is even shorter in comparing to that of a traditional parallel flash memory. Therefore, a serial flash memory can replace a traditional parallel flash memory completely.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for connecting low pin count (LPC, hereinafter) bus to serial flash memory, comprising:
   (a) fetching a LPC bus instruction;
   (b) converting the LPC bus instruction to a serial instruction according to the required format of a serial flash memory;
   (c) provided the serial instruction is a write instruction, recording the serial instruction, accumulating write instructions until N instructions are received, combining the accumulated instructions and outputting to a serial flash memory at one time, where N is a preset positive integer and a preferred setting equivalent to the efficient size of a central processing unit (CPU, hereinafter) process divided by 8;
   (d) provided the serial instruction is a read instruction, reading M bytes of data from the serial flash memory and outputting the data sequentially, where M is a preset positive integer and a preferred setting equivalent to the efficient size of a CPU process divided by 8;
   (e) converting an output data to the required format according to the LPC bus, where the output data is for responding to the LPC bus instruction; and
   (f) outputting the output data of converted format to the LPC bus.

2. The method for connecting LPC bus and serial flash memory as recited in claim 1, further comprising:
   calculating a cycle count of a clock signal provided by the LPC bus instruction, for identifying a command field, an address field, and a data field of the serial instruction.

3. The method for connecting LPC bus and serial flash memory as recited in claim 1, wherein the procedure (c) comprises:
   recording the data field of the serial instruction and the data field of a plurality of former write instructions; and
   provided N data fields are accumulated and recorded, outputting the command field and the address field of the serial instruction to the serial flash memory, and outputting the recorded data field to the serial flash memory according to the sequence of recording.

4. A method for connecting low pin count (LPC) bus and serial flash memory, comprising:
   (a) fetching an LPC bus instruction;
   (b) converting the LPC bus instruction to a serial instruction according to the required format of a serial flash memory;
   (c) outputting the serial instruction to a serial flash memory, wherein provided the serial instruction is a write instruction, the procedure (c) comprises:
       recording the data field of the serial instruction and the data field of a plurality of former write instructions;
       provided N data fields are accumulated and recorded, outputting the command field and the address field of the serial instruction to the serial flash memory, and outputting the recorded data to the serial flash memory according to the sequence of recording, where N is a preset positive integer and a preferred setting equivalent to the efficient size of a CPU process divided by 8;
   (d) receiving an output data outputted from the serial flash memory, converting the format of the output data, and outputting the output data of converted format to the LPC bus, where the procedure (d) comprises;
       provided the serial instruction is a read instruction, reading M bytes of data from the serial flash memory at one time, and outputting the data sequentially, wherein M is a preset positive integer and a preferred setting equivalent to the efficient size of a CPU process divided by 8;
       converting the data to the required format according to the LPC bus; and
       outputting the data of converted format to the LPC bus.

5. The method for connecting LPC bus and serial flash memory as recited in claim 4, further comprising:
   calculating a cycle count of a clock signal provided by the LPC bus instruction, for identifying a command field, an address field, and a data field of the serial instruction.

6. An apparatus for connecting low pin count (LPC) bus and serial flash memory, comprising:
   a latch, for registering and outputting a LPC bus instruction transmitted from a LPC bus;
   an instruction converter, for receiving the LPC bus instruction outputted from the latch, converting the LPC bus instruction to a serial instruction according to the required format of serial flash memory, and outputting the serial instruction;
   a parallel to serial converter, for receiving and recording the serial instruction outputted from the instruction converter, provided the serial instruction is a read instruction, accumulating and recording M read instructions, combining the read instructions, and converting the combined instruction from parallel signals to serial signals for output, provided the serial instruction is a write instruction, accumulating and recording N write instructions, combining the write instructions, and converting the combined instruction from parallel signals to serial signals for output, where M and N are both preset positive integer, M is a preferred setting equivalent to the efficient size of a CPU process divided by 8, and N is a preferred setting equivalent to the efficient data of a CPU process divided by 8;

a serial output device, for coupled in between the parallel to serial converter and a serial flash memory, outputting the serial signals outputted from the parallel to serial converter to the serial flash memory; and a serial to parallel converter, for receiving an output data which is needed for responding to the LPC bus instruction from the serial flash memory, convening the output data to the required format according to the LPC bus, and outputting the output data of converted format to the LPC bus.

7. The apparatus for connecting LPC bus and serial flash memory as recited in claim 6, wherein the instruction converter further comprises:

a command decoder, for coupled in between the latch and the parallel to serial converter, converting the command field of the LPC bus instruction to a command field of the serial instruction;

an address compare multiplexer, for coupled in between the latch and the parallel to serial converter, converting the address field of the LPC bus instruction to an address field of the serial instruction; and a data compare multiplexer, for coupled in between the latch and the parallel to serial converter, converting the data field of the LPC bus instruction to a data field of the serial instruction.

8. The apparatus for connecting LPC bus and serial flash memory as recited in claim 6, further comprising:

a counter, for receiving a clock signal provided by the LPC bus, calculating a cycle count of the clock signal, and outputting the cycle count to the parallel to serial converter and to the serial to parallel converter for identifying the command field, the address field, and the data field in the serial instruction.

9. The apparatus for connecting LPC bus and serial flash memory as recited in claim 6, wherein the serial to parallel converter further comprises:

a read register, when the serial instruction is a read instruction, for receiving M bytes of data from the serial flash memory at one time, converting the format of the data sequentially, and outputting to the LPC bus.

10. The apparatus for connecting LPC bus and serial flash memory as recited in claim 6, wherein the parallel to serial converter further comprises:

a batch read device, for receiving the command field and the address field of the serial instruction, and issuing instructions for reading M bytes of data from the serial flash memory at one time;

a write register, provided the serial instruction is a write instruction, for receiving the data field of the serial instruction, storing the data field of the serial instruction and the data field of former N-1 write instructions, and outputting the data fields according to the sequence of stores; and a batch write device, for receiving the output data field from the write register, and receiving the command field and the address field of the serial instruction, provided the serial instruction is a write instruction, outputting the command field and the address field of the serial instruction as well as the data fields to the serial flash memory.

* * * * *